US007175099B2

(12) United States Patent
Bilyard et al.

(10) Patent No.: US 7,175,099 B2
(45) Date of Patent: Feb. 13, 2007

(54) FLUID SENSING ARRANGEMENT AND MIXING SYSTEM

(75) Inventors: James Raymond Bilyard, Campbells Bay (NZ); Peter Jeromson, Auckland (NZ)

(73) Assignee: Emech Control Limited, Auckland (NZ)

( * ) Notice: Subject to any disclaimer, the term of this patent is extended or adjusted under 35 U.S.C. 154(b) by 286 days.

(21) Appl. No.: 10/381,631

(22) PCT Filed: Oct. 3, 2001

(86) PCT No.: PCT/NZ01/00211

§ 371 (c)(1),
(2), (4) Date: Sep. 18, 2003

(87) PCT Pub. No.: WO02/28519

PCT Pub. Date: Apr. 11, 2002

(65) Prior Publication Data

US 2006/0038026 A1 Feb. 23, 2006

(30) Foreign Application Priority Data

Oct. 3, 2000 (NZ) ..................................... 507319

(51) Int. Cl.
*F24H 9/20* (2006.01)
*G05Q 23/12* (2006.01)
*G01K 1/00* (2006.01)

(52) U.S. Cl. .................................... 236/12.11; 374/148

(58) Field of Classification Search ............. 236/12.11, 236/12.12, 12.15, 12.14; 374/138, 147, 148
See application file for complete search history.

(56) References Cited

U.S. PATENT DOCUMENTS

| | | | |
|---|---|---|---|
| 4,359,907 A | 11/1982 | Morin, III et al. | |
| 4,444,357 A * | 4/1984 | Lynch et al. | 236/12.12 |
| 4,991,976 A * | 2/1991 | Byles | 374/138 |
| 5,979,776 A * | 11/1999 | Williams | 236/12.12 |

FOREIGN PATENT DOCUMENTS

| | | |
|---|---|---|
| FR | 2 317 961 | 2/1977 |
| JP | 6257437 | 9/1994 |
| JP | 9287883 | 11/1997 |
| JP | 10253576 | 9/1998 |
| JP | 2000257934 | 9/2000 |

OTHER PUBLICATIONS

Derwent Abstract Accession No. 83106Y/47, Class K05 R14 DT 2619218 A (INTERATOM GMBH) Nov. 17, 1977.

Derwent Abstract Accession No. 29542Y/17 Class A31 H05 J02 FR 2317-961 A (CARUSO) Mar. 18, 1977.

Derwent Abstract Accession No. 92-342389/42 Class Q66 GB 2254569 A (TRITON PLC) Apr. 10, 1991.

* cited by examiner

*Primary Examiner*—Marc Norman
(74) *Attorney, Agent, or Firm*—Henricks, Slavin & Holmes LLP

(57) ABSTRACT

A sensing arrangement for sensing one or more properties of a fluid is provided. The sensing arrangement includes a fluid flow path (3) and a sensing means (5) to sense one or more properties of the fluid. The sensing means (5) is positioned or positionable within the fluid flow path (3). In use, the sensing arrangement directs the fluid in a substantially spiral flow (2) within the fluid flow path (3) past the sensing means (5). Also provided is a method of sensing one or more properties of a fluid and a fluid system for controlling one or more properties of a fluid.

52 Claims, 3 Drawing Sheets

FLUID SENSING ARRANGEMENT AND MIXING SYSTEM

TECHNICAL FIELD

The present invention relates to improvements in and relating to fluid property sensing arrangements and more particularly, but not exclusively to a mixing system including a temperature sensing arrangement of a design that is able to contribute towards improved temperature sensing and/or a method of improved temperature sensing in a mixing valve.

BACKGROUND

To the present time, the accurate sensing of temperature of a fluid resulting from the mixing of fluids of different temperatures has proved difficult and false temperature values can easily be obtained due to the incomplete mixing of the fluids and/or the positioning of the temperature sensor. For valve systems and the like that rely on accurate temperature sensing as a control signal, inaccuracies in temperature measurement may be particularly problematic. Similar problems may result with mixing of any fluids having different properties, where those properties need to be measured in the mixed fluid.

The term “fluid” is used throughout this specification to cover both liquids and gases. However, by way of simplicity, the present invention will be described particularly in respect of its use in the temperature sensing in conjunction with a mixing valve used for the mixing of hot and cold liquids.

In a domestic or industrial water supply, where hot and cold water is being mixed, a particular problem can be experienced where the hot and cold water pressures and variable hot and cold inlet orifices are substantially equal. This circumstance seems to promote a particular difficulty in correctly ascertaining the temperature of the mixed water, which will ultimately be supplied to the end user.

OBJECTS OF THE INVENTION

The present invention, therefore, has as one object of one embodiment to provide improved temperature sensing in or for a fluid mixing system that overcomes or alleviates problems in fluid mixing systems at present. Another or alternative object of the invention is to provide the public with a useful alternative.

Further objects of the invention, according to its various embodiments, will become apparent from the following description.

SUMMARY OF THE INVENTION

According to one aspect of the present invention, there is provided a sensing arrangement for sensing one or more properties of a fluid, the sensing arrangement including a fluid flow path and a sensing means to sense one or more fluid properties positioned or positionable within the fluid flow path, wherein in use, the sensing arrangement directs the fluid in a substantially spiral flow within the fluid flow path past the sensing means.

Preferably, the sensing arrangement may include an inlet through which fluid enters the fluid flow path, wherein the fluid inlet is located off centre and oriented to include a transverse component relative to the fluid flow path so as to create the spiral flow.

Preferably, the fluid inlet may be oriented substantially perpendicular to the fluid flow path.

Preferably, the sensing means may be positioned approximately 1.5 D away from the fluid inlet, where D is the diameter of the fluid inlet.

In an alternative embodiment, the sensing means may be positioned less than 1.5 D away from the fluid inlet, when D is the diameter of the fluid inlet.

Preferably, the sensing means may be position d approximately 0.25 A into th fluid flow path where A is the diameter of the fluid flow path.

Preferably, the ratio of D:A may be approximately 0.65:1.

Preferably, the sensing means may sense the temperature of fluid within the fluid flow path.

Preferably, the sensing arrangement may be located downstream of a fluid mixing system fed from at least two fluid supplies, the fluid mixing system having an outlet that forms the inlet to the sensing arrangement.

Preferably, the fluid mixing system may be fed with a hot and a cold water supply and wherein the sensing arrangement provides a signal indicative of the temperature of the fluid to a control means for controlling supply of hot and cold water from the hot and cold water supply.

According to a further aspect of the present invention, a method of sensing one or more properties of a fluid includes providing a temperature sensing means and providing in a fluid flow path a spiral flow of a fluid of which one or more properties is to be sensed, and positioning the sensing means within said spiral flow.

Preferably, the method may include creating the spiral flow by directing fluid into the fluid flow path through an inlet located off centre and at an orientation including a transverse component to said fluid flow path.

Preferably, the method may include directing fluid into the fluid flow path substantially transverse to the fluid flow path.

Preferably, the method may include positioning the sensing means approximately 1.5 D away from the fluid inlet, where D is the diameter of the fluid inlet.

In an alternative embodiment, the method may include positioning the sensing means less than 1.5 D away from the fluid inlet, where D is the diameter of the fluid inlet.

Preferably, the method may include positioning the sensing means approximately 0.25 A into the fluid flow path, where A is the diameter of the fluid flow path.

Preferably, the ratio of D:A may be approximately 0.65:1.

According to another aspect of the present invention, there is provided a fluid system for controlling one or more properties of a fluid, the fluid system including a fluid flow path for the fluid and at least one sensor to sense one or more properties of the fluid and provide a control signal to a controller for controlling at least one of the one or more properties of the fluid dependent on the control signal, wherein in use, the fluid system directs fluid through the fluid flow path in a substantially spiral flow and the at least one sensor is located within the fluid flow path.

Preferably, the fluid within the fluid flow path may be downstream of a location of mixing of at least two fluids.

Preferably, the fluid system may include an inlet to the fluid flow path, wherein the fluid inlet is located off centre and oriented to include a transverse component relative to the fluid flow path so as to create the spiral flow.

Preferably, the at least one sensor may be positioned approximately 1.5 D away from the fluid inlet, where D is the diameter of the fluid inlet.

In an alternative embodiment, the at least one sensor may be positioned less than 1.5 D away from the fluid inlet, where D is the diameter of the fluid inlet.

Preferably, the at least one sensor may be positioned approximately 0.25 A into the fluid flow path where A is the diameter of the fluid flow path.

Preferably, the ratio of D:A may be approximately 0.65:1.

Preferably, the at least one sensor may sense the temperature of fluid within the fluid flow path.

Preferably, the fluid system may be used to sense one or properties of water, wherein the controller controls the supply of at least two supplies of water, each supply at a different temperature.

According to a further aspect of the present invention, there is provided a sensing arrangement for a fluid substantially as herein described and with reference to the accompanying drawings.

According to still further aspect of the present invention, there is provided a method of sensing one or more properties of a fluid substantially as herein described and with reference to the accompanying drawings.

According to another aspect of the present invention, there is provided a fluid system for controlling one or more properties of a fluid substantially as herein described and with reference to the accompanying drawings.

Further aspects of this invention, which should be considered in all its novel aspects will become apparent from the following description, given by way of example of a possible embodiment thereof and in which reference is made to the accompanying drawings.

DESCRIPTION OF PREFERRED EMBODIMENTS

The present invention includes a sensing arrangement for a fluid, which may be used as part of a control system for fluid mixing. The sensing arrangement includes a fluid flow path, in which fluid is directed in a substantially spiral flow within the fluid flow path is located a sensor to detect a property of the fluid.

The invention may have application to industrial and domestic water supply temperature measurement. The spiral flow induced in the fluid may allow the temperature sensor to be located close to the location of fluid mixing and close to the feed of water to be mixed. Therefore, where the temperature measurement forms part of a control system a faster response time may result.

However, the present invention may have application to fluids other than water and to the detection of properties of a fluid other than temperature. The fluid may be liquid, gas, a vapour or in a mixture of states. Sensing arrangements in accordance with the invention may sense one or a number of properties of the fluid and may be used in the control of one, all or any combination of properties.

Thus, although the following description has been give with particular reference to the sensing of temperature of a liquid and particularly the temperature of mixed hot and cold water, the invention is not limited to such an implementation. It will be appreciated that the present invention could be used in detecting one or more specified properties/characteristics of any required fluid or mixture of fluids, for example pH, viscosity, colour and/or composition.

Figure 1:
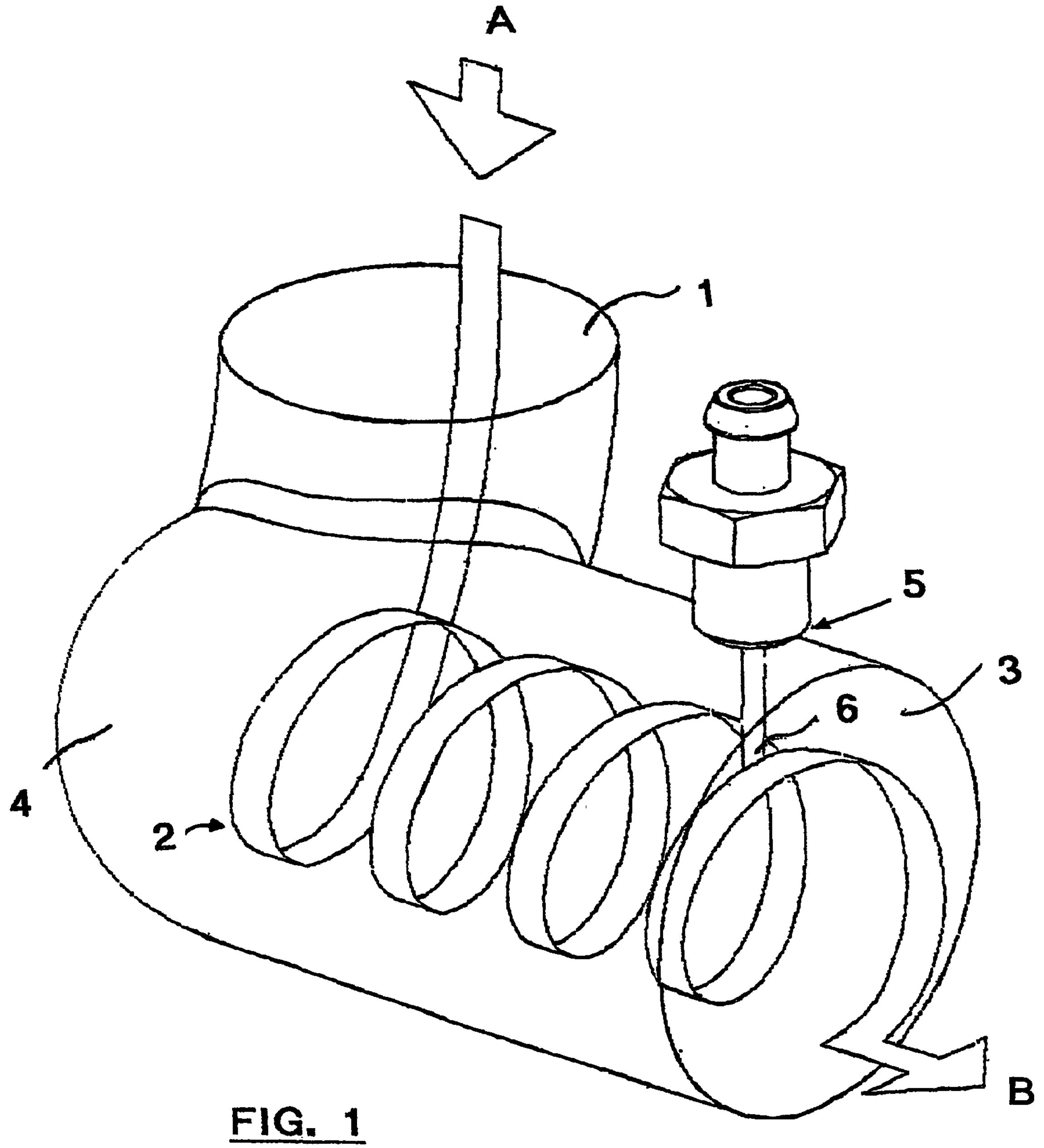
FIG. 1: shows diagrammatically a temperature sensing arrangement according to one possible embodiment of the invention.

Referring particularly to FIG. 1, a fluid the temperature of which is required to be sensed, is shown flowing in a direction A into an inlet 1 from which it will flow along a conduit or passage way 3. The flow of fluid is indicated very diagrammatically by the spiral 2 with the flow of fluid into the passageway 3 being offset relative to a central axis of the inlet 1 so that as the fluid enters substantially tangentially into the passageway 3, the fluid will commence a spiral flow as indicated in a direction indicated by arrow B. A bulbous chamber 4 may be provided at the entrance to assist in the formation of the spiral flow. It is envisaged that suitable means such as some baffling may be provided to enhance the spiral inducing effect as will be apparent to those skilled in the art.

By providing an offset tangential entry of the fluid along the arrow A, a spiral flow is created essentially by the curvature of the inner walls of the passageway 3. The inlet 1 may not necessarily feed fluid into the passageway 3 perpendicular to the direction of travel of the fluid along the passageway, although this is the preferred embodiment. By changing the angle of feed of the fluid to the passageway 3 to include a component along the passageway 3, the number of revolutions in the spiral flow per unit distance along the passageway may be varied. Also, the speed of the fluid along the passageway 3 may be affected.

A temperature sensing means 5 is shown positioned relative to the inlet 1. The sensing means 5 is shown with a probe 6 directed into the spiral flow 2. Suitable sensors for temperature measurement include thermocouples or a thermistors. Where properties of the fluid other than temperature are being sensed, a suitable sensor to detect that or those properties is provided.

Figure 2:
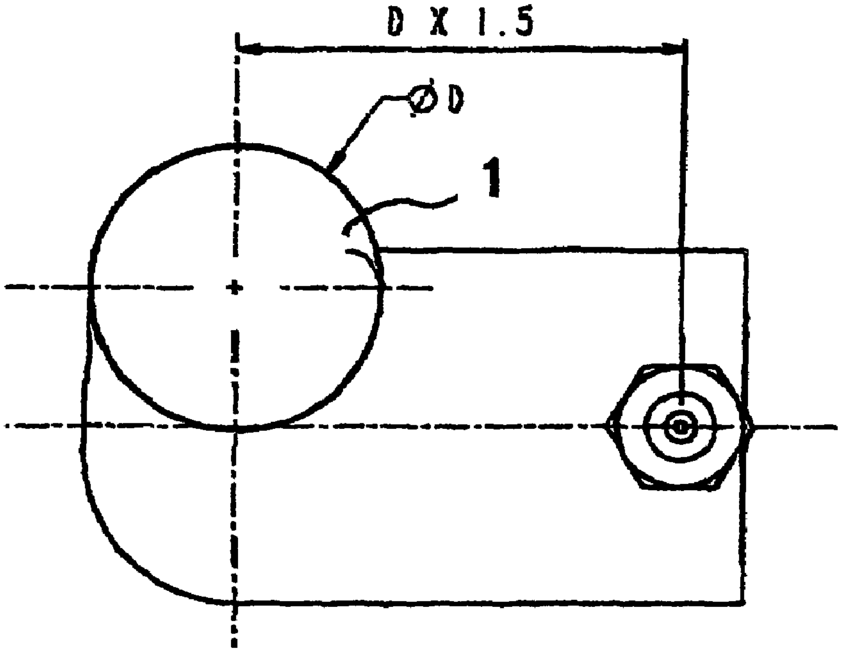
FIG. 2: shows very diagrammatically a plan view of the temperature sensing arrangement of FIG. 1.

As indicated in FIG. 2, the positioning of the temperature sensing means 5 relative to the inlet 1 may be at approximately 1.5 D where "D" is the diameter of the inlet 1 or may be closer, for example 1.0 D. A benefit of the present invention is that the sensing means 5 may be positioned in this way relatively close to the inlet 1 so that the unit is compact. This may improve the response time of any control system dependent on the sensed property or properties. It will be appreciated, however, that if compactness was not an issue, then the sensing means 5 could be positioned wherever appropriate along the length of the passageway 3. The performance of the sensing arrangement may vary depending on the positioning of the sensing means 5 and the position for optimal performance may vary depending on the fluids used, their speed through the fluid flow path and the shape of the spiral flow within the fluid flow path.

Figure 3:
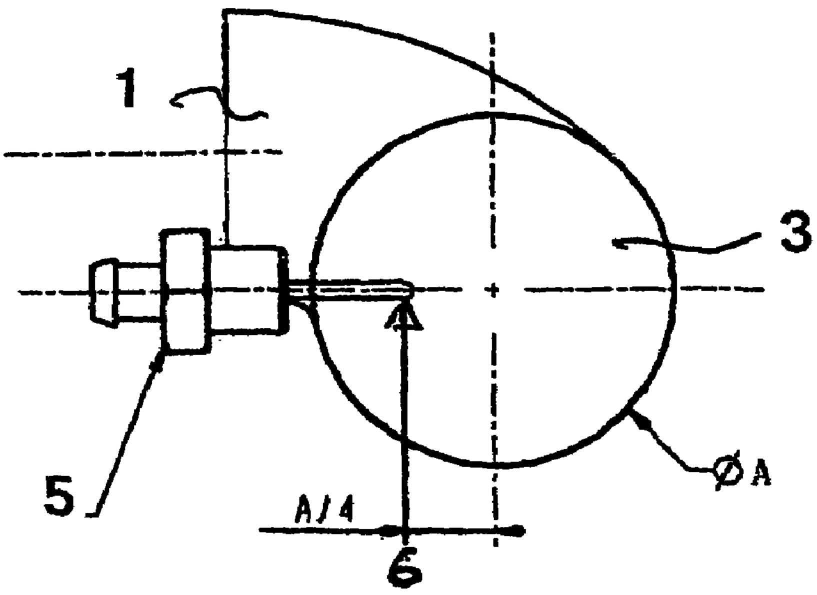
FIG. 3: shows very diagrammatically an end view of the temperature sensing arrangement of the preceding figures.

Referring now to FIG. 3, the probe 6 may extend for example approximately 0.25 A into the passageway 3 where "A" is the diameter of the passageway 3, although this distance is determined by the most appropriate position according to the flow characteristics in the passageway 3. The probe 6 may permanently extend into the passageway 3, or may be removable or retractable if required, wherein the probe is extended into the passageway 3 to obtain sample measurements.

An added benefit of the invention is that mixing may be achieved without the use of baffles or the like which would interfere with the fluid flow.

Referring particularly to FIG. 3, the positioning of the inlet 1 relative to the passageway 3 is shown as providing an essentially tangential entry of the fluid into the passageway 3 to create the spiral effect. The inlet 1 may receive fluid from a mixing system to which water of two different temperatures is supplied. The mixing system may be of any suitable type, which may depend on the fluid to be sensed.

Although the invention may be used to measure properties of a fluid passing through a passageway wherein the inlet fluid is the same as the outlet fluid, the invention is anticipated to have particular application to when some properties of the fluid have changed. A common example of this is the mixing of two fluids into one. However, other changes may be implemented such as heating using an external source, introduction of an additive to the fluid flow or any other change that may be required as part of a fluid cycle or process. The present invention may be used to control such changes.

Figure 4:
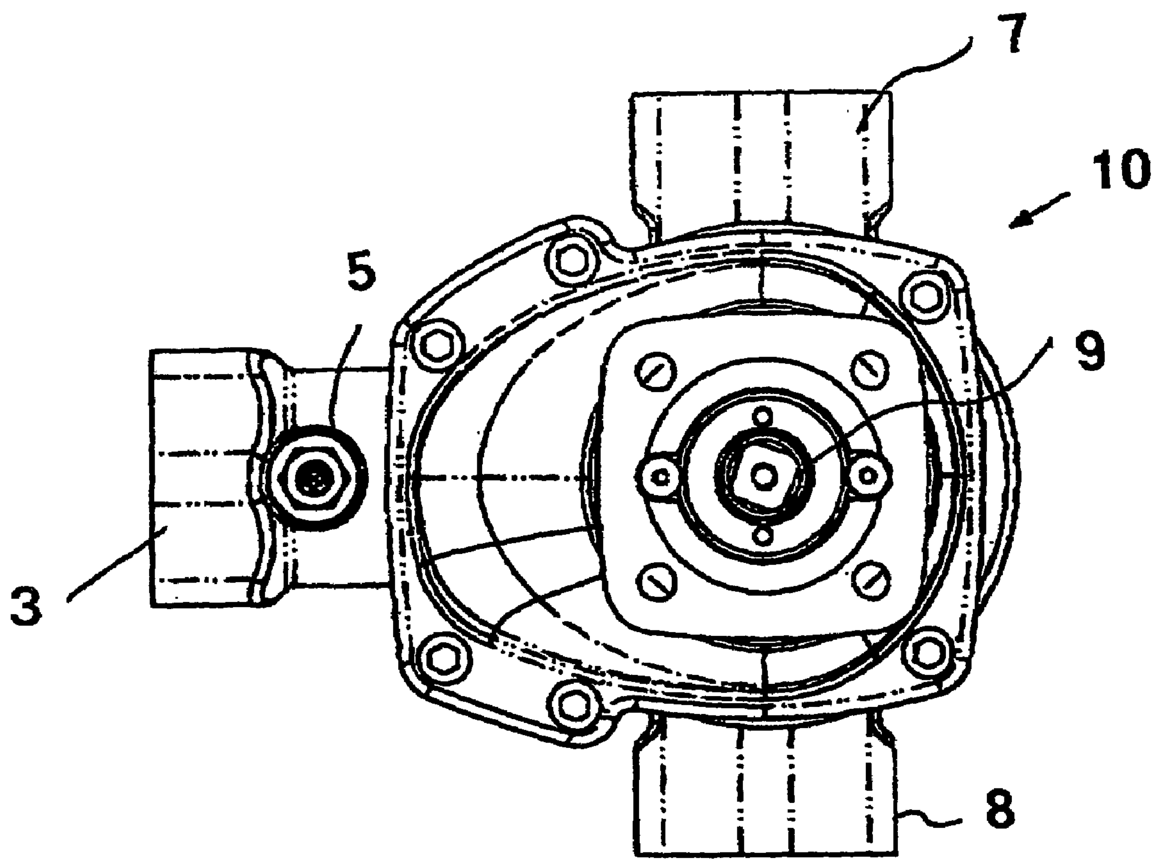
FIG. 4: shows a plan view of one possible embodiment of a mixing valve to which the present invention may relate.

Referring to FIG. 4, the temperature sensor 5 is shown provided as part of a mixing valve 10 with a typical control mechanism 9 controlling the mixing of hot and cold fluids flowing into the mixing valve 10 through inlets 7 and 8 respectively and leaving through the passageway 3. The mixing valve 10 combines the fluids from inlets 7 and 8 into a single fluid flow to the inlet 1. The mixing valve 10 may include a mixing chamber or the like to encourage mixing of the two fluids. Turbulence may be introduced to the flow within the mixing chamber to assist mixing if required.

The control mechanism 9 may be operated by a stepper motor, which in turn is controlled by a suitable control circuit (not shown). The control circuit may receive as an input a signal from the temperature sensor 5. The control circuit may control the stepper motor to progressively open or close the inlets 7 and 8 dependent on whether the signal from the temperature sensor 5 indicates a temperature above or below a predetermined set point. Those skilled in the relevant arts will recognise that there are a large number of possible control apparatus and control methodologies that may be used.

The ratio of the diameters of the inlet 1 and the passageway 3 may be adjusted to optimise the spiral action mixing of the fluid in the passageway 3. If appropriate, an insert may be provided in the inlet 1 and/or the passage 3 to provide the optimal ratio. It has been found that a small diameter D of inlet 1 relative to diameter A of passageway 3 may provide an optimal result. A ratio of D:A of approximately 0.65:1 is one which has provided good test results for good temperature sensing and flow.

The mixing valve 10 may be constructed from moulded metal to form the required fluid passageways. Seals are provided at joints where required to avoid leaks. The materials used, dimensions of the mixing valve 10 and dimensions of the passageways may vary depending the fluid/s used and the required rate of fluid communication through the mixing valve.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. A sensing arrangement for sensing one or more properties of a fluid, received from a mixing system, the sensing arrangement including a fluid flow path and a sensor to sense one or more fluid properties positioned or positionable within the fluid flow path, and a fluid inlet through which fluid enters the fluid flow path, wherein the fluid inlet is located and oriented to include a transverse component relative to the fluid flow path so as to create a substantially spiral flow within the fluid flow path past the sensor.

2. The sensing arrangement of claim 1, the fluid inlet through which fluid enters the fluid flow path is positioned off-center relative to the fluid flow path.

3. The sensing arrangement of claim 1, wherein the fluid inlet is oriented substantially perpendicular to the fluid flow path.

4. The sensing arrangement of claim 3, wherein the sensor is positioned within a distance of approximately 1.5 D from the fluid inlet, where D is the diameter of the fluid inlet.

5. The sensing arrangement of claim 4, where A is the diameter of the fluid flow path and wherein the ratio of D:A is approximately 0.65:1.

6. The sensing arrangement of claim 5, wherein the sensor is positioned approximately 0.25 A into the fluid flow path.

7. The sensing arrangement of claim 4, wherein the sensor is positioned approximately 0.25 A into the fluid flow path, where A is the diameter of the fluid flow path.

8. The sensing arrangement of claim 1, wherein the sensor is positioned approximately 1.5 D away from the fluid inlet, where D is the diameter of the fluid inlet.

9. The sensing arrangement of claim 1, wherein the sensor is positioned less than 1.5 D away from the fluid inlet, where D is the diameter of the fluid inlet.

10. The sensing arrangement of claim 1, wherein the sensor is positioned approximately 0.25 A into the fluid flow path, where A is the diameter of the fluid flow path.

11. The sensing arrangement of claim 10, wherein the sensor is positioned within approximately 1.5 D from a fluid inlet through which fluid enters the fluid flow path, where D is the diameter of the fluid inlet and wherein the ratio of D:A is approximately 0.65:1.

12. The sensing arrangement of claim 1, wherein the sensor senses the temperature of fluid within the fluid flow path.

13. The sensing arrangement of claim 1, wherein the sensing arrangement is located downstream of a fluid mixing system fed from at least two fluid supplies, the fluid mixing system having an outlet that forms the inlet to the sensing arrangement.

14. The sensing arrangement of claim 9, wherein the fluid mixing system is fed with a hot and a cold water supply and wherein the sensing arrangement provides a signal indicative of the temperature of the fluid to a control means for controlling supply of hot and cold water from the hot and cold water supply.

15. The sensing arrangement of claim 1, wherein the diameter of the fluid inlet is approximately 65% of the diameter of the fluid flow path.

16. The sensing arrangement of claim 15, wherein the sensor is positioned within a distance of approximately 1.5 D from the fluid inlet, where D is the diameter of the fluid inlet.

17. The sensing arrangement of claim 1 wherein the sensing arrangement directs fluid in a substantially spiral flow within the fluid flow path substantially without the use of baffles.

18. A method of sensing one or more properties of a fluid including receiving the fluid of which one or more properties is to be sensed from a mixing system, providing a fluid flow path for the fluid, providing a sensor and providing in the fluid flow path a spiral flow by directing the fluid into the fluid flow path through an inlet located and oriented to have a transverse component to the fluid flow path, and positioning the sensor within said spiral flow.

19. The method of claim 18, including creating the spiral flow by directing fluid into the fluid flow path through an inlet located and oriented off-center relative to said fluid flow path.

20. The method of claim 18, including directing fluid into the fluid flow path substantially transverse to the fluid flow path.

21. The method of claim 20, including positioning the sensor within a distance of approximately 1.5 D from the fluid inlet, where D is the diameter of the fluid inlet.

22. The method of claim 21, where A is the diameter of the fluid flow path and wherein the ratio of D:A is approximately 0.65:1.

23. The method of claim 21, including positioning the sensor approximately 0.25 A into the fluid flow path.

24. The method of claim 21, including positioning the sensor approximately 0.25 A into the fluid flow path, where A is the diameter of the fluid flow path.

25. The method of claim 18, including positioning the sensor approximately 1.5 D away from the fluid inlet, where D is the diameter of the fluid inlet.

26. The method of claim 18, including positioning the sensor less than 1.5 D away from the fluid inlet, where D is the diameter of the fluid inlet.

27. The method of claim 18, including positioning the sensor approximately 0.25 A into the fluid flow path, where A is the diameter of the fluid flow path.

28. The method of claim 27, including positioning the sensor approximately 1.5 D away from the fluid inlet, where D is the diameter of the fluid inlet and wherein the ratio of D:A is approximately 0.65:1.

29. The method of claim 18, wherein the diameter of the fluid inlet is approximately 65% of the diameter of the fluid flow path.

30. The method of claim 29, wherein the sensor is positioned within a distance of approximately 1.5 D from the fluid inlet, where D is the diameter of the fluid inlet.

31. The method of claim 18 wherein providing in the fluid flow path a spiral flow includes providing a spiral flow substantially without the use of baffles.

32. A fluid system for controlling at least one property of a fluid, the fluid system including a fluid flow path for the fluid and at least one sensor to sense at least one property of the fluid and provide a control signal to a controller for controlling at least one of the properties of the fluid sensed by the at least one sensor dependent on the control signal, and a fluid inlet through which fluid enters the fluid flow path, wherein the fluid inlet is located and oriented to include a transverse component relative to the fluid flow path so as to create a substantially spiral flow within the fluid flow path past the sensor.

33. The fluid system of claim 32 wherein the fluid inlet is located and oriented to be off-center relative to the fluid flow path so as to create the spiral flow.

34. The fluid system of claim 32, wherein the fluid flow path is downstream of a location of mixing of at least two fluids.

35. The fluid system of claim 34, wherein the at least one sensor is positioned approximately 1.5 D away from the fluid inlet, where D is the diameter of the fluid inlet.

36. The fluid system of claim 34, wherein the at least one sensor is positioned less than 1.5 D away from the fluid inlet, where D is the diameter of the fluid inlet.

37. The fluid system of claim 34, wherein the fluid inlet is oriented substantially perpendicular to the fluid flow path.

38. The fluid system of claim 32, wherein the at least one sensor is positioned approximately 0.25 A into the fluid flow path, where A is the diameter of the fluid flow path.

39. The fluid system of claim 38, wherein the sensor is positioned within approximately 1.5 D from a fluid inlet to the fluid flow path, where D is the diameter of the fluid inlet and wherein the ratio of D:A is approximately 0.65:1.

40. The fluid system of claim 39, wherein the fluid inlet is oriented transverse to the fluid flow path and off-center of the fluid flow path so as to create said spiral flow.

41. The fluid system of claim 32, wherein the at least one sensor senses the temperature of fluid within the fluid flow path and wherein fluids of different temperatures are mixed under the control of the controller at said location of mixing of at least two fluids.

42. The fluid system of claim 32 when used to sense one or more properties of water and wherein the controller controls the supply of at least two supplies of water to said location of mixing, each supply at a different temperature.

43. The fluid system of claim 32, wherein the fluid inlet is oriented substantially perpendicular to the fluid flow path and the at least one sensor is positioned within 1.5 D from the fluid inlet, where D is the diameter of the fluid inlet.

44. The fluid system of claim 43, wherein the diameter of the fluid inlet is approximately 65% of the fluid flow path.

45. The fluid system of claim 43, wherein the at least one sensor is positioned approximately 0.25 A into the fluid flow path, where A is the diameter of the fluid flow path.

46. The fluid system of claim 32, wherein the diameter of the fluid inlet is approximately 65% of the diameter of the fluid flow path.

47. The fluid system of claim 46, wherein the at least one sensor is positioned within 1.5 D from the fluid inlet, where D is the diameter of the fluid inlet.

48. The fluid system of claim 43 wherein the fluid inlet is located and oriented to create a substantially spiral flow within the fluid flow path past the sensor substantially without the use of baffles.

49. A sensing arrangement for sensing one or more properties of a fluid, the sensing arrangement including a fluid flow path extending in a first direction, a sensor position in the fluid flow path to allow a sensor to sense one or more fluid properties when positioned within the fluid flow path, and a fluid inlet downstream from a fluid mixing area and upstream from the sensor position, the fluid entering the fluid flow path from the fluid inlet, wherein the fluid inlet is oriented at least partly transverse to the first direction and located relative to the fluid flow path so as to create a substantially spiral flow within the fluid flow path past the sensor.

50. The sensing arrangement of claim 49 wherein the fluid flow path has a curvature and wherein the fluid inlet is oriented substantially on a tangent to the curvature of the fluid flow path.

51. The sensing arrangement of claim 50 wherein the fluid inlet is centered substantially off center of the flow path.

52. The sensing arrangement of claim 49 further including a mixing chamber upstream from the fluid inlet, wherein the fluid inlet is between the mixing chamber and the temperature sensor, and the inlet and the flow passage are configured so that the substantially spiral flow occurs between the fluid inlet and the sensor.

* * * * *